US012032807B1

(12) United States Patent
Zambrano et al.

(10) Patent No.: US 12,032,807 B1
(45) Date of Patent: Jul. 9, 2024

(54) ASSISTIVE COMMUNICATION METHOD AND APPARATUS

(71) Applicant: Arrowhead Center, Inc., Las Cruces, NM (US)

(72) Inventors: Tianna Mari Zambrano, Silver City, NM (US); Joan E. Wilson, Albuquerque, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 0 days.

(21) Appl. No.: 17/983,178

(22) Filed: Nov. 8, 2022

Related U.S. Application Data

(60) Provisional application No. 63/276,684, filed on Nov. 8, 2021.

(51) Int. Cl.
*G06F 3/0482* (2013.01)

(52) U.S. Cl.
CPC ................. *G06F 3/0482* (2013.01)

(58) Field of Classification Search
CPC ............ H01J 37/3255; H01J 37/3244; H01J 37/32532; H01J 37/32568; C23C 4/04; C23C 4/11; C23C 4/12
See application file for complete search history.

(56) References Cited

U.S. PATENT DOCUMENTS

| | | | |
|---|---|---|---|
| 10,148,808 B2 | 12/2018 | Campbell et al. | |
| 11,017,693 B2 | 5/2021 | Gordon et al. | |
| 11,089,985 B2 | 8/2021 | Voss et al. | |
| 2015/0310867 A1* | 10/2015 | LeBeau | G10L 15/26 455/563 |
| 2021/0407203 A1* | 12/2021 | Canberk | G06F 3/013 |
| 2022/0036759 A1* | 2/2022 | Proudfoot | G09B 5/06 |
| 2022/0129072 A1* | 4/2022 | Forsland | G09B 21/00 |
| 2022/0179665 A1* | 6/2022 | Rathod | G06F 9/451 |

FOREIGN PATENT DOCUMENTS

| | | |
|---|---|---|
| IN | 362016 | 8/2016 |
| IN | 392016 | 9/2016 |
| JP | 2018136546 A | 8/2018 |

(Continued)

OTHER PUBLICATIONS

"LAMP Word for Life Language System", https://www.prentrom.com/prc_advantage/lamp-words-for-life-language-system, Downloaded Sep. 8, 2023.

(Continued)

*Primary Examiner* — Cao H Nguyen
(74) *Attorney, Agent, or Firm* — Peacock Law, P.C.; Justin R. Jackson

(57) ABSTRACT

A method and apparatus for an augmentative alternative communication ("AAC") apparatus which presents a user with selection options of words and/or phrases that can be audibly transmitted to others. The AAC apparatus can optionally include one or more bio-feedback sensors which enable the audible transmissions to be adapted based on the sensed bio data. Such adaptations can include prosodic changes in the transmitted words and/or phrases. Optionally, the selection options that are presented to the user can be adaptively updated and presented to the user based on sensed surroundings of the AAC apparatus.

20 Claims, 3 Drawing Sheets

(56) References Cited

FOREIGN PATENT DOCUMENTS

| | | |
|---|---|---|
| KR | 20210094323 A | 7/2021 |
| WO | 2020145439 A1 | 7/2020 |

OTHER PUBLICATIONS

"Proloquo2Go", https://www.assistiveware.com/products/proloquo2go#price, Downloaded Sep. 8, 2023.

"Tobii Dynavox", https://us.tobiidynavox.com/, Downloaded Sep. 8, 2023.

"TouchChat", https://touchchatapp.com/, Downloaded Sep. 8, 2023.

Barker, R. Michael, et al., "Support for AAC Use in Preschool, and Growth in Language Skills, for Young Children with Development Disabilities", Augmentative and Alternative Communication, vol. 29. No. 4, 2013, 334-346.

Costigan, F. Aileen, et al., "A Review of Preservice Training in Augmentative and Alternative Communication for Speech-Language Pathologists, Special Education Teachers, and Occupational Therapists", Assistive Technology, 22, RESNA, 2010, 200-212.

Fulop, Sean A., "A Spectrogram for the Twenty-First Century", Acoustic Today, Jul. 2006, 26-33.

Moorcroft, Alison , et al., "Speech pathologist perspectives on the acceptance versus rejection or abandonment of AAC systems for children with complex communication needs", Augmentation and Alternative Communication, vol. 35, No. 3, Society for Augmentative and Alternative Communication, 2019, 193-204.

Muttiah, Nimisha A., et al., "Providing instructional support for AAC service delivery in low- and middle-income (LAMI) countries", International Journal of Speech-Language Pathology, Taylor & Francis, 2015, 1-13.

Stenfelt, Stefan , "Acoustic and Physiologic Aspects of Bone Conduction Hearing", Adv. Otorhinolaryngol., vol. 71, 2011, 10-21.

Tager-Flusberg, Helen , et al., "Minimally Verbal School-Aged Children with Autism Spectrum Disorder: The Neglected End of the Spectrum", Autos, Res., vol. 6, No. 6, Dec. 2013.

* cited by examiner

ASSISTIVE COMMUNICATION METHOD AND APPARATUS

CROSS-REFERENCE TO RELATED APPLICATIONS

This application claims priority to and the benefit of the filing of U.S. Provisional Patent Application No. 63/276,684, entitled "Assistive Communication Method and Apparatus", filed on Nov. 8, 2021, and the specification thereof is incorporated herein by reference.

STATEMENT REGARDING FEDERALLY SPONSORED RESEARCH OR DEVELOPMENT

Not Applicable.

BACKGROUND OF THE INVENTION

Embodiments of the present invention relate to an assistive communication method and apparatus, particularly one which enables users to easily adjust speed of production of sentences and/or phrases and/or to express one or more words with emotion.

It is reported that one in four individuals with autism spectrum disorder who enter school use fewer than five spoken words. For these individuals, the use of augmentative alternative communication ("AAC") apparatuses can substantially increase their ability to communicate their needs and wants. Known AAC apparatuses, however, are typically difficult to procure in low-resource settings. High tech options for AAC apparatuses can cost $500 or more and be complicated and difficult to navigate. Further, most AAC apparatuses assist in producing functional communication, but often do little to improve expressive and receptive language. Still further, known AAC apparatuses merely recite the user's selection audibly and do not provide internal bone vibrations consistent with what a person would experience when speaking the statement themselves.

Typical communication occurs in a loop of complex sensory exchanges. For verbal speech users, the words they speak create sound waves that are transmitted by an auditory signal, which is also accompanied by vibrations from the acoustic speech signal that conduct within the speaker's skull bones. Additionally, a typical spoken message conveys meaning beyond the words that are chosen through voice patterns of pitch and loudness, immediacy of speech rate, and emphasis on certain words, all of which occur simultaneous to the words that are spoken. Unfortunately, existing communication apparatuses do not allow users to access these additional, sensory pieces of communication, relying instead on robotic sounding voices that simply say a word after a button is pushed. For example, when attempting to add emotion to a short phrase in a language acquisition through motor planning ("LAMP") assistive communication device by tapping on the exclamation point tile on the screen to add it to the end of the phrase, it was found that the addition of the exclamation point was barely detectable in making the phrase sound any differently than before.

There is thus a present need for an affordable, high-tech AAC apparatus and/or smartphone application ("app") that assists with functional communication while also capitalizing on the user's sensory system to provide linguistic input, particularly one which offers many words and phrases for communicating and that has the capability of growing with the individual, and which can enable a user to easily speed up the speech rate and/or add emphasis or emotion to one or more words. There is also a present need for an AAC apparatus and/or smart phone application, which enables the user to receive not only audible feedback, but also through bone vibrations consistent with what would be experienced if the user were actually saying the word or phrase.

BRIEF SUMMARY OF EMBODIMENTS OF THE PRESENT INVENTION

Embodiments of the present invention relate to a method for automatically updating selection options on a user interface of an AAC apparatus, the method including obtaining information about an environment around the AAC apparatus with a microphone and/or with a geolocation sensor, using the obtained information to generate or otherwise obtain one or more selection options with a processor, automatically updating the user interface with the processor in real time to present at least one of the one or more selection options. The one or more selection options can include a plurality of selection options and the method can also include ranking the plurality of selection options based upon predetermined criteria. The predetermined criteria can include a relevance score. Optionally, obtaining information about an environment around the AAC apparatus can include listening to sounds in the environment that are produced by persons other than the user of the AAC apparatus.

In one embodiment obtaining information about an environment around the AAC apparatus can include obtaining geolocation information. The method can further include searching a database to obtain information about the obtained geolocation. The step of using the obtained information to generate or otherwise obtain one or more selection options can include generating or otherwise obtaining the one or more selection options based on the information obtained from searching the database. The method can also include training the AAC apparatus with training data and at least some of the training data can be input into the microphone and/or obtained from the geolocation sensor. The training data can be obtained during interactions between the user and one or more speakers and/or can be obtained by the microphone from a speaker as step in creating a speaker profile.

The method can also include analyzing, with the processor, and retaining information relating to an interaction between the user and a speaker at a geolocation and subsequently generating or otherwise obtaining selection options in real time based on the retained information, when the AAC apparatus is subsequently taken to that geolocation or within a predetermined distance thereof. In one embodiment, the predetermined distance can be within 100 feet of the geolocation. The method can also include obtaining biometric data of the user and adjusting an audio output of the AAC apparatus in real time based on the obtained biometric data. Optionally, obtaining information about an environment around the AAC apparatus can further include obtaining video and/or image information in real time. The method can also include performing analysis by the processor on the video and/or image information in real time to identify one or more objects and/or people within the environment.

An embodiment of the present invention also relates to an augmentative alternative communication ("AAC") apparatus having a processor, a microphone, a speaker, a user interface, a non-tangible computer readable media with software stored thereon the software including code causing the microphone to listen to an environment around the AAC apparatus and code causing the processor to automatically update the user interface to present one or more selection options based on what is heard in the environment by the microphone.

The AAC apparatus can also include code causing the processor to analyze information about the environment around the AAC apparatus and generate one or more selection options which are deemed relevant based on the information. The AAC apparatus can also include a geolocation sensor configured to obtain a geolocation of the AAC apparatus. Optionally, the AAC apparatus can also include code causing the processor to recognizing a speaker based on voice recognition.

In one embodiment, the AAC apparatus can also include a video camera configured to obtain video information about the environment around the AAC apparatus. The AAC apparatus can also include code causing the processor to recognize objects and/or people within the environment around the AAC apparatus.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Embodiments of the present invention relate to a novel AAC method and apparatus, which can include an app for a smart phone for individuals with complex communication needs. Thus, as used throughout this application, the term AAC apparatus is intended to include not only a stand-alone AAC apparatus, but can also include an AAC app operating on a smartphone, tablet, computer or other electronic apparatus, such that the existing components of the other electronic apparatus form the components of the AAC apparatus.

Figure 1:
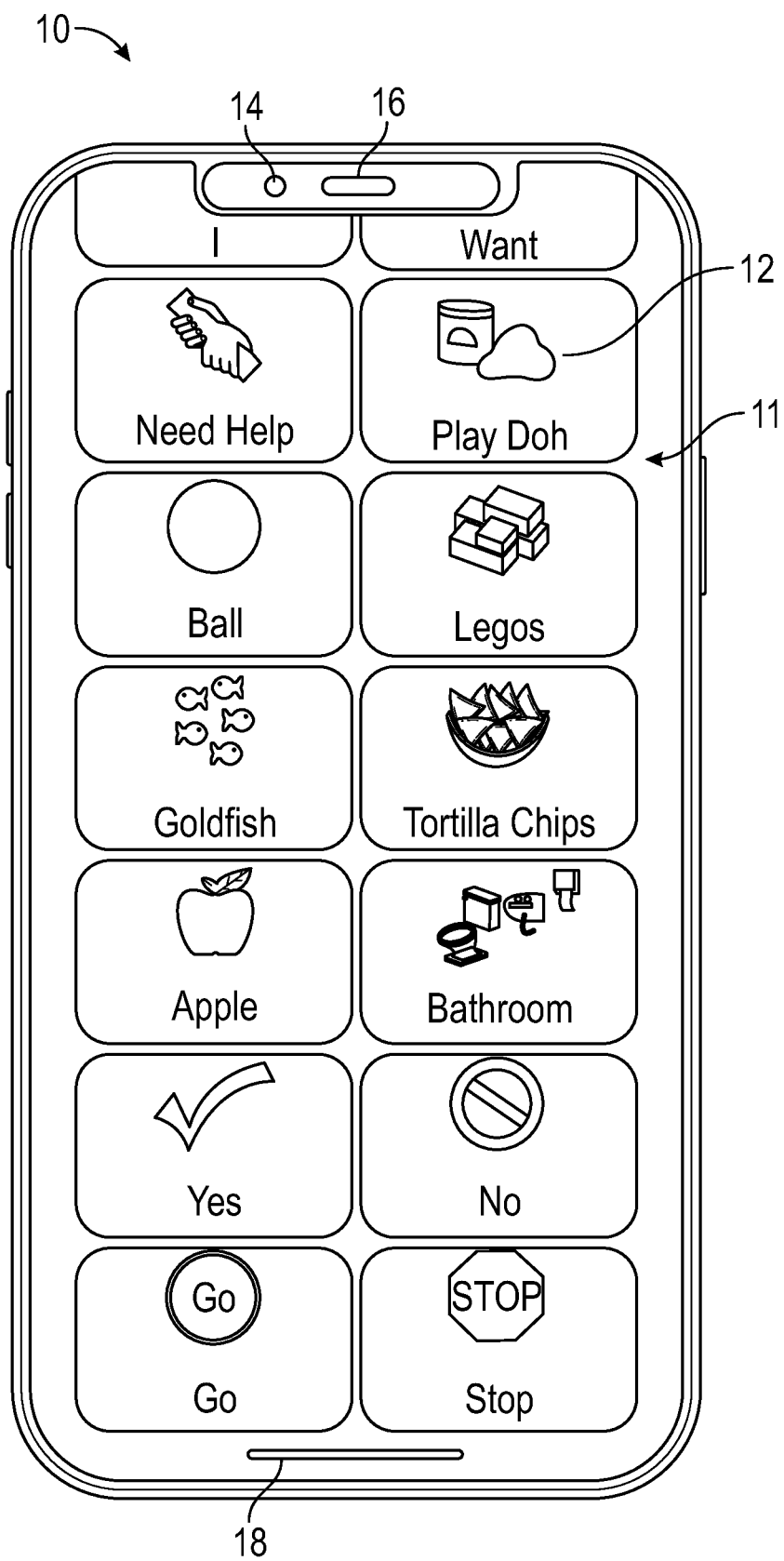
FIG. 1 is a drawing which illustrates a smartphone with a user interface of an AAC application according to an embodiment of the present invention.

Referring now to the drawings, as best illustrated in FIG. 1, an AAC apparatus 10 preferably includes user interface 11 with a plurality of selection options 12 for words and/or short phrases. As with conventional AAC apparatuses, the user simply selects one of the selection options 12 which causes the apparatus to announce the word or phrase from its speaker 16. Optionally, a user can select a series of words and/or phrases and then cause the apparatus to state an entire sentence or phrase. Unlike conventional AAC apparatuses, however, AAC apparatus 10 can incorporate haptic, vibrational feedback that is based on the same vibrations that would be found in a typically occurring sound wave from speech (e.g., if a user chooses to tap the tile for "tortilla chips" on their apparatus, they will hear the apparatus say the words while also simultaneously feeling the matching bone vibrations propagating through their skull, which is similar to what speakers experience during natural speech). This can optionally be accomplished, for example by coupling one or more bone conduction headphones to an output of apparatus 10, which are most preferably disposed adjacent or near the mastoid bone behind the user's ear. Alternatively, the vibrations can be produced by a transducer that generates even larger vibrations and the user can place the transducer on a different portion of their body and/or can hold the transducer in their hands to feel the vibrations.

In one embodiment, however, AAC apparatus 10 can be configured to produce an output which provides enhanced prosodic features of speech such that the prosodic features of speech are much more pronounced (for example the output of AAC apparatus 10 can provide an increased amplitude or otherwise modified output such that the vibrational output is more pronounced when prosodic features occur) or that prosodic features of speech are otherwise communicated to the user such that they are more apparent. For example, AAC apparatus 10 can be configured to output a predetermined output that signifies a prosodic feature of speech, for example two pulses can be output to emulate rage or another prosodic feature of speech. In one embodiment, the bone conductance system can be a head-worn unit and AAC apparatus 10 can be configured to add the sensory input found in speech production, with a particular emphasis on prosodic features that tie to the expression of emotion. Such system is particularly useful for individuals with autism who frequently struggle with the use of prosody to show emotion in their speech.

AAC apparatus 10 can include software functions to produce the word(s) chosen on the apparatus for others to hear, while also simultaneously taking the speech acoustic wave form for that word(s) and producing a matching vibrational pattern that the user can feel through the transducer. In one embodiment, the speaker and/or transducer can be coupled directly via a wired connection or can be coupled via a radio frequency connection, including but not limited to BLUETOOTH®, a registered trademark of Bluetooth Sig, Inc. This speech-based haptic feedback improves the sensory-language experience of the user to make it more like natural speech, which assists the user in re-connecting to important pieces of sensory feedback during communication that are currently missing from existing apparatuses.

Figure 2:
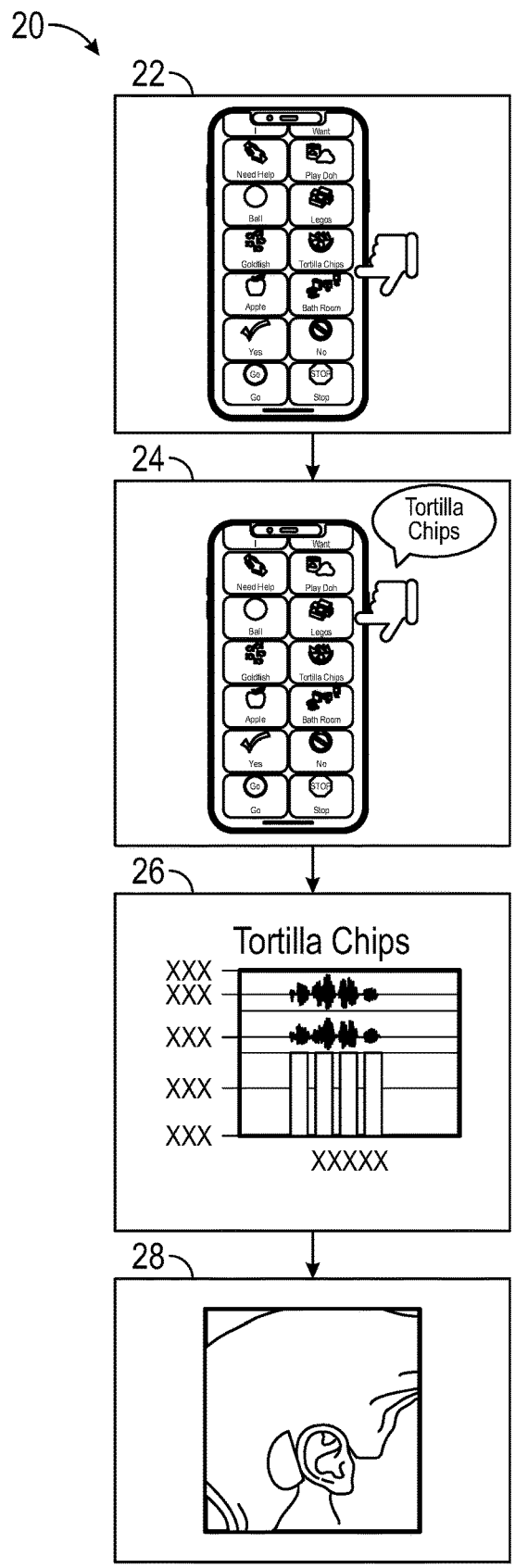
FIG. 2 is a diagram which illustrates how an AAC app or AAC apparatus of an embodiment of the present invention can be used.

In one embodiment, as best illustrated in FIG. 2, a user can add emotion or other emphasis to a word by performing an action. For example, in one embodiment, instead of merely touching a word, if a user wishes to add emphasis to a word when the word is played by AAC apparatus 10, the user can touch the word and then perform some other action, for example swipe up. Of course, an almost infinite number of swipe types and/or gestures and/or actions could be used instead of swiping up. For example, a user could double-tap a word to add more emphasis or could even triple-tap a word to cause the word to be played very forcefully; for example if a user were to triple-tap on the word "No", AAC apparatus 10 could play a very forceful "NO!". Or the user could tap the word and then swipe up or swipe down or slide left or right or the speed that the user taps on a word can change how the word is played; for example if a user touches a word for 200 milliseconds ("ms") or longer, the word can be played with no emphasis, but if the user touches a word for 100 milliseconds or less, the word can be played with some emphasis, and if a user touches a word for only 50 milliseconds or less, the word can be played very forcefully. In one embodiment, one or more of the words or phrases that are programmed into AAC apparatus 10 can be pre-recorded. In this embodiment, when prerecording the word for a particular word or phrase, a variety of different recordings can be made so that the word is recorded with no emphasis, some emphasis and/or a lot of emphasis and thus, the action of the user which results in more or less emphasis being added to the word can result in AAC apparatus 10 playing the recording of the word with the corresponding amount of emphasis.

Although emphasis can be added to a word or phrase, as described above, embodiments of the present invention also have the ability to add other prosodic components to spoken words and/or phrases (including for example intonation, stress, rhythm, pitch, etc.). This can be accomplished by the user performing some other action, including for example by dragging a finger in a predetermined direction after or when the word or phrase is selected.

In one embodiment, AAC apparatus 10 can include one or more accelerometers or other sensors which enable AAC apparatus 10 to sense manipulations that a user is performing to AAC apparatus 10. Optionally, for example, video image analysis or one or more accelerometers can be used to detect when a user is shaking AAC apparatus 10 from side to side or in a circular movement or up and down. In one embodiment, when such movement is detected, AAC apparatus 10 can alter the playback of the selected word, phrase, or sentence. For example, when AAC apparatus 10 detects that a user is shaking AAC apparatus 10 side to side, AAC apparatus 10 can cause the playback of the selected word, phrase, or sentence to be increased. Or, if a user moves AAC apparatus 10 in a clockwise circle, the playback volume can be increased and likewise if a user moves AAC apparatus 10 in a counterclockwise circle, the playback volume can be decreased. Of course, numerous other manipulations and movements can be detected and can thus be used to make any desired change or alteration in the playback of a word, phrase or sentence.

Optionally, words and/or phrases can be programmed to be played when a user makes a predetermined action, for example by flinging a finger from a corner of the screen to allow an immediate production of message like "no" or "no way", and sliding a finger up and down the side of the screen to allow emphasis to show intensity, such as "I don't think so!" In these ways, AAC apparatus 10 allows immediate expressions of mood and/or emotion, including its intensity.

The ability to craft playback statements with more expression, mood, or emotion provides a greater level of user engagement (which has the ability to reduce apparatus abandonment levels), thus improving language growth and development through increased sensory language inputs, and facilitating improved language interventions for users who have language processing or language expression disorders.

Optionally, one or more biosensor inputs (also occasionally referred to herein as "bio-feedback") can be connected to and/or incorporated into AAC apparatus 10. For example, in one embodiment, bio sensor apparatus 14 can be attached to or otherwise configured to collect biometric data from a user. Biosensor apparatus 14 is preferably communicably coupled to AAC apparatus 10. Based on output data of biosensor apparatus 14, AAC apparatus 10 can be configured to add emphasis or emotion to one or more words and/or to otherwise adjust a speed, cadence, or other prosodic component of a word, phrase, or sentence. Any desired bio-feedback apparatus can be used, but in one embodiment, biosensor apparatus 14 can include one or more of a wrist strap, a finger clip, and/or a digital camera. In one embodiment, a digital camera, which can include but is not limited to a front-facing camera on a smart phone, can be used as biosensor apparatus 14. In this embodiment, AAC apparatus 10 preferably includes facial recognition software which enables the smartphone to determine if a user is smiling, frowning, or making some other facial expression and/or moving their head. AAC apparatus 10 can then modulate how utterances are played based on the user's facial expression and/or head movements at the time of entering each word or phrase. Thus, for example, if a user is frowning when selecting words on AAC apparatus 10, the words are preferably played back with a prosodic component (including but not limited to for example, intonation, stress, rhythm, etc.) such that the words sound like they are being said by a person who is frowning when they are saying the words. For other embodiments, biosensor apparatus 14 can monitor the conductivity of a user's skin, or the user's heart rate, or another biometric of the user.

Optionally, biosensor apparatus 14 can be incorporated into AAC apparatus 10, and/or it can be separate from and thus removably positionable with respect to AAC apparatus 10. Optionally, a plurality of bio-feedback apparatuses can be provided, including one which is physically incorporated into AAC apparatus 10 and one which is physically separate from but communicably coupled to AAC apparatus 10. For example, in one embodiment biosensor apparatus 14 can be coupled via a direct electrical connection or via a wireless connection. Optionally, AAC apparatus 10 can use biosensor data to determine the user's mood to form the appropriate prosodic and acoustic speech patterns to create a more sophisticated speech output, unlike known products which use a robotic voice. Biosensor data that can be collected can include, but is not limited to, facial emotion detection, skin temperature, heart rate, blood pressure, combinations thereof and the like. For example, if heart rate and/or facial emotion detection indicates the user is angry, the voice output will include speech and prosodic characteristics typically attributed to anger in this user's social circle, thus allowing for speech generation that includes the user's emotions.

In one embodiment, AAC apparatus 10 preferably comprises a global positioning system ("GPS") which enables AAC apparatus 10 to identify the GPS coordinates of its location. Optionally, AAC apparatus 10 can include a programming or setup mode, which enables AAC apparatus 10 to listen to the surroundings and add words or phrases that it detects with high frequency, and AAC apparatus 10 can then automatically add such high frequency words or phrases to the user interface, or can suggest them for addition so that the user can perform some simple action to accept or reject such suggestions. For example, in one embodiment, when AAC apparatus 10 is at a user's house, the setup mode can be activated such that AAC apparatus 10 listens to the conversations of those around AAC apparatus 10 such that if the occupants are talking about "pizza" and AAC apparatus 10 thus detects the word "pizza" to be a high frequency word, an option for the word "pizza" can automatically be added to the interface, or can be offered to the user such that the user can accept or reject the addition of the word "pizza" to the interface.

Optionally, AAC apparatus 10 can include a setup feature where when activated, a user can then say a word or phrase and AAC apparatus 10 can automatically then add the word or phrase to the interface. In one embodiment, AAC apparatus 10 can include a global positioning system unit and can reference its location against known locations and can make suggestions based on the geographic location. For example, if AAC apparatus 10 is taken into a fast-food restaurant, AAC apparatus 10 can use a map feature or otherwise link to the Internet to recognize this and can then temporarily add words to the user interface that correspond with menu items for that restaurant and/or can add other words or phrases that may be useful for someone visiting that restaurant. In addition to and/or in lieu of AAC apparatus 10 using GPS information to capture relevant location data from the Internet, AAC apparatus 10 can identify common words, phrases, and/or topics that have previously occurred when AAC apparatus was in the same general GPS location. For example, if the user often attends church and AAC 10 has thus heard church-related words and phrases spoken or otherwise output by AAC apparatus 10 in the past at that location, upon AAC apparatus 10 traveling to that same general GPS location, AAC apparatus 10 can populate interface 11 with selection options 12 that are location appropriate. Optionally, AAC apparatus 10 can listen to the environment and automatically update selection options 12 based on what it hears. Although selection options 12 can automatically be updated with high-frequency words, selection options 12 can also optionally be updated with words that are believed to be relevant with respect to what is heard—for example, if AAC apparatus 10 hears a speaker asking a question that can be answered with a "yes" or "no" answer, selection options 12 can be updated to present those as options. Optionally selection options 12 can be assigned a relevancy score and AAC 10 can then present the selection options which have the highest relevancy scores.

In one embodiment, AAC apparatus 10 can include microphone 18 (FIG. 1) and can comprise voice recognition software which enables AAC apparatus 10 to recognize individuals who are talking around AAC apparatus 10 (such individuals hereinafter referred to as a "speaker" or "speakers") and to then adjust selection options 12 and/or pronunciations and/or prosodic features that better fit each individual speaker. For example, AAC apparatus 10 can comprise a learning mode whereby a user can create a speaker profile, much like creating a contact on a smart phone. In this embodiment, the learning mode can be activated and the speaker can be instructed to speak such that the AAC apparatus can learn to associate that speaker's voice with that speaker profile. AAC apparatus 10 can optionally be configured to allow a user to populate the speaker's profile with predetermined words/phrases which can appear on user interface 11 when AAC apparatus 10 subsequently detects that the speaker is speaking. And/or the user can voluntarily choose to launch the speaker profile and populate the user interface with the predetermined words that were previously associated with that speaker profile. Once AAC apparatus 10 detects the presence of a particular speaker, AAC apparatus 10 can watch for high-frequency responses from the user when engaging in conversations with that speaker. For example, if the user's father often discusses football with the user, when AAC apparatus 10 subsequently detects the presence of the father, AAC apparatus 10 can automatically populate user responses associated with football.

In one embodiment, AAC apparatus 10 can further comprise and/or be communicably coupled to a wearable apparatus, including but not limited to, for example, a smart watch, which can enable the user to access and use AAC apparatus 10 without having to have AAC apparatus 10 in their hand. Thus, the wearable can interface remotely with AAC apparatus 10, for example via a wireless connection, which can include a BLUETOOTH® communication standard. Likewise, in one embodiment, the wearable apparatus can comprise a bio-feedback sensor. Optionally, the wearable can be configured to resemble jewelry or another decorative or functional item. As best illustrated in FIG. 3, decorative bracelet 36 can house a bio-feedback sensor and a battery which can transmit the sensed bio-feedback data wirelessly to AAC apparatus 10.

Figure 3:
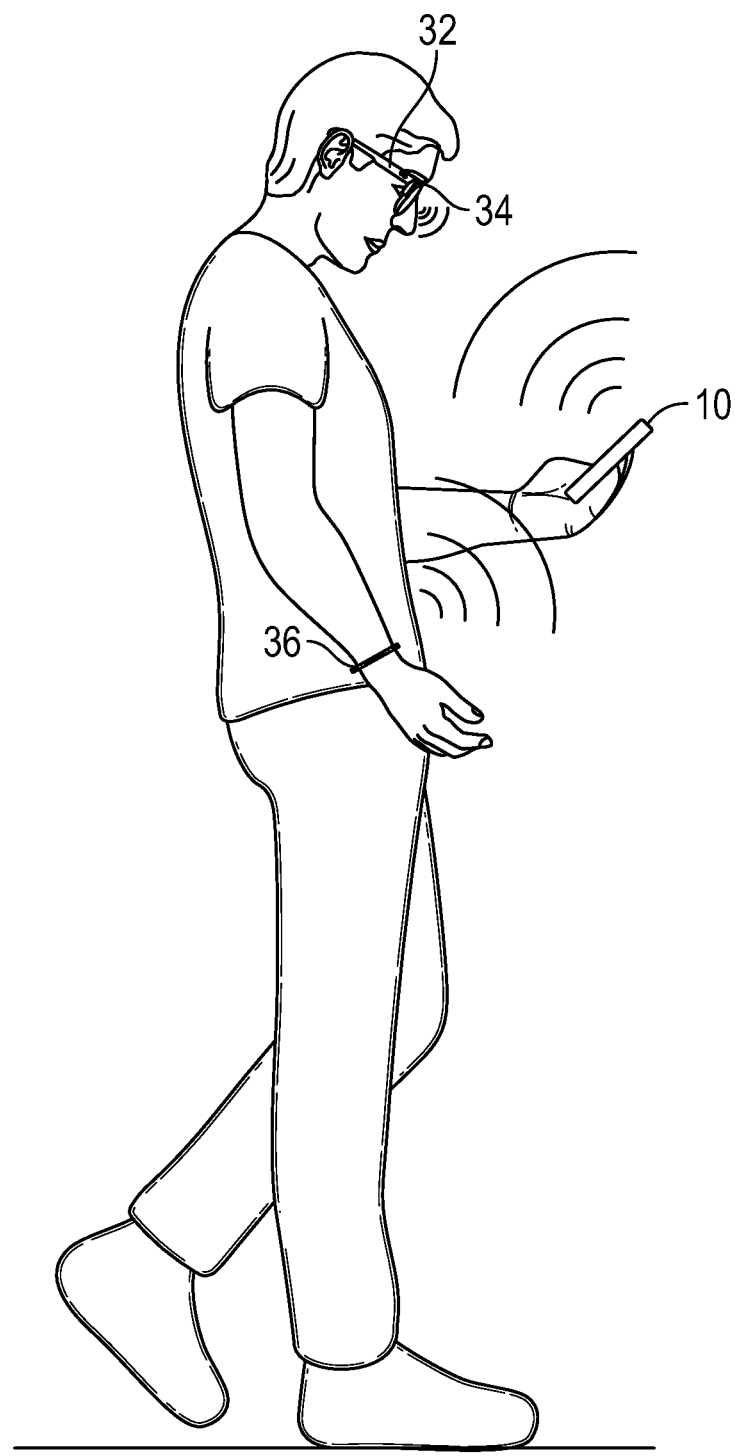
FIG. 3 is a drawing which illustrates an embodiment of the present invention wherein an AAC apparatus is communicably coupled to a pair of smart glasses and to a biofeedback apparatus which is configured to look like jewelry.

As further illustrated in FIG. 3, AAC apparatus 10 can include remote camera 34, which can optionally be incorporated into smart glasses 32. In this embodiment, data can be transmitted from remote camera 34 via a physical connection or wirelessly. In this embodiment, AAC apparatus 10 can include object recognition software that utilizes software with an algorithm for object detection, which can include, for example object detection program You Only Look Once v.4 ("YOLO v4")) such that if camera 34 is looking at one or more recognized objects, AAC apparatus 10 can automatically populate selection options 12 of user interface 11 with words associated with those objects. In one embodiment, the objects that are recognized can be stored such that they are associated with the GPS location in a location-specific communication ecosystem. For example, a student can scan their classroom and immediately have those selection options presented on interface 11. Additionally, if the object detection algorithm is unable to identify the specific object, photos of objects that are viewed with high frequency can be used to populate selection options without a written label In addition, camera 34 can include facial recognition software, including for example facial recognition software offered by Kairos AR, Inc. thus enabling camera 34 to scan faces while AAC 10 records the voices of individuals in order to create and/or populate the speaker profile, as well as people in frequent social circles of the user. And, upon subsequent encounters with the speaker, the speaker can be recognized via the facial recognition software, thus enabling AAC 10 to populate interface 11 with selection options 12 related to that speaker profile, including immediate greeting phrases with the speaker's name and a summary of high frequency conversation topics discussed at recent, previous encounters.

In one embodiment, AAC apparatus 10 can listen to the acoustic speech patterns of the user's social circle and can output words having prosodic features and/or pronunciations which are similar to those used in the user's social circle. Thus, AAC apparatus 10 can provide user-specific and/or social circle-specific speech patterns and pronunciations, thus enabling the output generated by the user's interaction with AAC apparatus 10 to more appropriately fit a given social circle. Optionally, this customization of speech patterns and/or pronunciations can be applied on an individual-to-individual level based on the identified speaker and past interactions with the identified speaker.

In light of the foregoing, in one embodiment AAC apparatus 10 can determine appropriate output responses and/or selection options by identifying the communication partner, location, and utilizing biosensor technology to emulate a response. This output can optionally be manipulated by the user to adapt to the conversation partners he or she may encounter. Thus, AAC apparatus 10 is focusing on both the user's actions and outside communication partners, GPS location, and/or relevant information about the GPS location from past experiences there, and/or from information from the Internet about that location. AAC apparatus 10 can thus predict common questions and/or comments one might make based on the social circle and setting, including follow-up questions from the last time the user interacted with a particular speaker.

Optionally, AAC apparatus 10 can use Bayesian program learning software, including for example GeNIe 2.0 & SMILE developed by BayesFusion, LLC, or Bayesian Network Tools in Java, with reference tables and/or artificial intelligence and machine learning to emulate language patterns used in that speaker's social community by using built-in microphones and biosensor technology. Speech output can be created using an open-source software program, including for example Festival Speech Synthesis, developed by the University of Edinburgh.

In one embodiment, AAC apparatus 10 does not perform operations based on speech input by the user of AAC apparatus 10. In one embodiment, AAC apparatus 10 is a self-contained unit and does not require an external apparatus to function. Optionally, AAC apparatus does not use Braille. In one embodiment, AAC apparatus 10 does not perform eye tracking. As used throughout this application, the term "user" is intended to include only the person who is choosing which of the selection options to select from interface 11 and does not include the persons who are engaging in conversation with that person. In one embodiment, the user comprises a person with a disability who relies on use of AAC apparatus 10 for the user's verbal communication.

Optionally, embodiments of the present invention can include a general or specific purpose computer or distributed system programmed with computer software implementing steps described above, which computer software may be in any appropriate computer language, including but not limited to C, C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more microprocessors and/or microcontrollers (collectively and individually referred to herein as a "processor") can operate via instructions of the computer code and the software is preferably stored on one or more tangible non-transitive memory-storage apparatuses.

As used throughout this application the term "real time" means less than about three seconds. Note that in the specification and claims, "about", "approximately", and/or "substantially" means within twenty percent (20%) of the amount, value, or condition given. All computer software disclosed herein may be embodied on any non-transitory computer-readable medium (including combinations of mediums), including without limitation CD-ROMs, DVD-ROMs, hard drives (local or network storage apparatus), USB keys, other removable drives, ROM, and firmware.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A method for automatically updating selection options on a user interface of an augmentative alternative communication ("AAC") apparatus, the method comprising:
    obtaining information about an environment around the AAC apparatus with a microphone and/or with a geolocation sensor;
    using the obtained information to generate or otherwise obtain one or more selection options with a processor, wherein generating or otherwise obtaining happens automatically without requiring speech input from a user; and
    automatically updating the user interface with the processor in real time to present at least one of the one or more selection options, such that the AAC can output the at least one of the one or more selection options as speech when selected by the user.

2. The method of claim 1 wherein the one or more selection options comprises a plurality of selection options and wherein the method further comprises ranking the plurality of selection options based upon predetermined criteria.

3. The method of claim 2 where the predetermined criteria comprises a relevance score.

4. The method of claim 1 wherein obtaining information about an environment around the AAC apparatus comprises listening to sounds in the environment that are produced by persons other than the user of the AAC apparatus.

5. The method of claim 1 wherein obtaining information about an environment around the AAC apparatus comprises obtaining geolocation information.

6. The method of claim 5 further comprising searching a database to obtain information about the obtained geolocation.

7. The method of claim 6 wherein using the obtained information to generate or otherwise obtain one or more selection options comprises generating or otherwise obtaining the one or more selection options based on the information obtained from searching the database.

8. The method of claim 1 further comprising training the AAC apparatus with training data and wherein at least some of the training data is input into the microphone and/or obtained from the geolocation sensor.

9. The method of claim 8 wherein the training data is obtained during interactions between the user and one or more speakers.

10. The method of claim 8 wherein the training data is obtained by the microphone from a speaker as step in creating a speaker profile.

11. The method of claim 1 further comprising analyzing with the processor and retaining information relating to an interaction between the user and a speaker at a geolocation and subsequently generating or otherwise obtaining selection options based on the retained information in real time when the AAC apparatus is subsequently taken to that geolocation or within a predetermined distance thereof.

12. The method of claim 1 further comprising obtaining biometric data of the user and adjusting an audio output of the AAC apparatus in real time based on the obtained biometric data.

13. The method of claim 1 wherein obtaining information about an environment around the AAC apparatus further comprises obtaining video and/or image information in real time.

14. The method of claim 13 further comprising performing analysis by the processor on the video and/or image information in real time to identify one or more objects and/or people within the environment.

15. An augmentative alternative communication ("AAC") apparatus comprising:
 a processor;
 a microphone;
 a speaker;
 a user interface;
 non-tangible computer readable media with software stored thereon the software comprising:
 code causing said microphone to listen to an environment around said AAC apparatus;
 code causing said processor to automatically update said user interface to present one or more selection options based on what is heard in the environment by said microphone without requiring further speech input by a user of the AAC; and
 said AAC configured to output speech corresponding to a selected option.

16. The AAC apparatus of claim 15 further comprising code causing said processor to analyze information about the environment around said AAC apparatus and generate one or more selection options which are deemed relevant based on the information.

17. The AAC apparatus of claim 15 further comprising a geolocation sensor configured to obtain a geolocation of the AAC apparatus.

18. The AAC apparatus of claim 15 further comprising code causing said processor to recognizing a speaker based on voice recognition.

19. The AAC apparatus of claim 15 further comprising a video camera configured to obtain video information about the environment around said AAC apparatus.

20. The AAC apparatus of claim 19 further comprising code causing said processor to recognize objects and/or people within the environment around said AAC apparatus.

* * * * *